July 7, 1959 P. GENIN 2,893,442
REINFORCING WOVEN MATERIALS FOR MAKING LAMINATED ARTICLES
Filed March 1, 1954 2 Sheets-Sheet 1
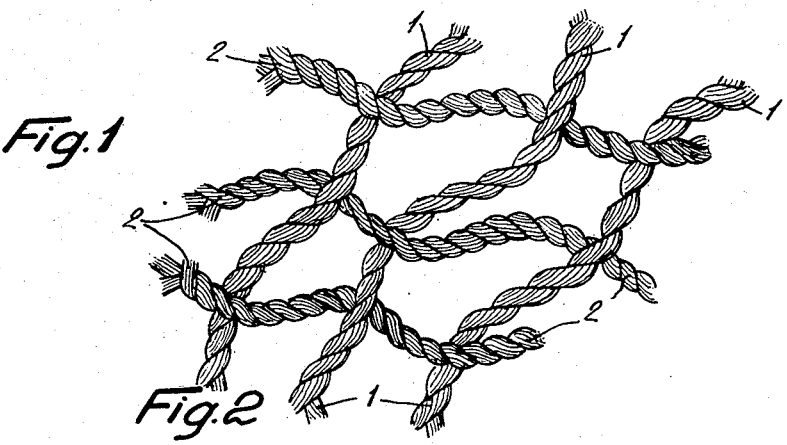
Fig.1
Fig.2
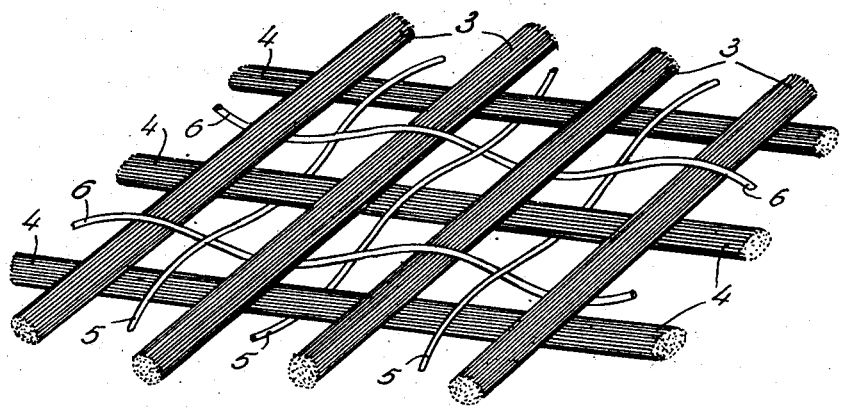
Fig.3
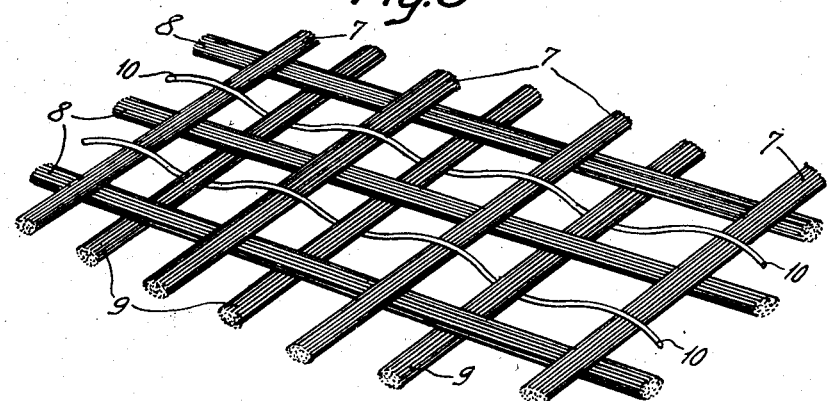
INVENTOR
PAUL GÉNIN
By Linton and Linton
ATTORNEYS United States Patent Office 2,893,442
Patented July 7, 1959

2,893,442

REINFORCING WOVEN MATERIALS FOR MAKING LAMINATED ARTICLES

Paul Genin, Paris, France

Application March 1, 1954, Serial No. 413,321

Claims priority, application France March 30, 1953

4 Claims. (Cl. 139—383)

This invention relates to a compound product consisting of plastic material having embedded therein one or more sheets of woven material. Articles of this type, sometimes called "laminations," are now used in increasingly larger amounts and types, but basically they are all characterized by a relatively high modulus of elasticity. The woven material constitutes the reinforcement of the structure, and the higher its modulus of elasticity, the wider the field of applications of the product, mainly as a substitute for metal parts and sheets.

Now the essential difficulty in the manufacture of the reinforcing woven material incorporated in these laminations is to obtain a material having a high modulus of elasticity or a low coefficient of elongation, in order to enable this property to be imparted to the plastic material in which it is embedded. Thus, when the woven material consists of glass fibres, although the latter possess a very high modulus of elasticity, the intercrossing and overlapping of the warp and weft yarns in the material woven according to the conventional methods results in a more or less sinuous yarn pattern. In a lamination of the kind above referred to, if a tension is applied to the yarns these will tend, through their elongation, to reduce the aforesaid sinuousities and to bear on one another. As a result, mechanical bending stresses develop within the lamination and are likely to be detrimental to its strength and rigidity.

Besides, the sinuous patterns of the glass yarns are also likely to interfere with the high modulus of elasticity of the glass material, considering the latter separately in its drawn-fibre condition.

Now this present invention is concerned primarily with a novel woven material intended for use as a reinforcement in laminated compound structures of the kind above referred to wherein the yarns serving as reinforcement are disposed in two directions without any sinuosity and without being interlaced directly with and in one another, these yarns being assembled by means of thinner auxiliary yarns having the sole purpose of keeping the reinforcing yarns in their proper respective position in the structure.

With this procedure it is therefore possible to suppress any sinuosity in the reinforcing yarns, as the latter are no more given the pattern deriving from the the usual alternate interlacing and superposition resulting from the weaving of yarns through the conventional methods.

The attached drawings forming part of this specification illustrate diagrammatically by way of example several forms of embodiment of the invention.

In the drawings:

Figure 1 shows at a greatly magnified scale one type of conventional pattern of woven material comprising the usual twisted and sinuously arranged yarns;

Figure 2 is a similar view showing a woven material made in accordance with the teachings of this invention and comprising two layers of reinforcing yarns;

Figure 3 is a similar view of a modified embodiment comprising three layers of reinforcing yarns.

Figure 4:
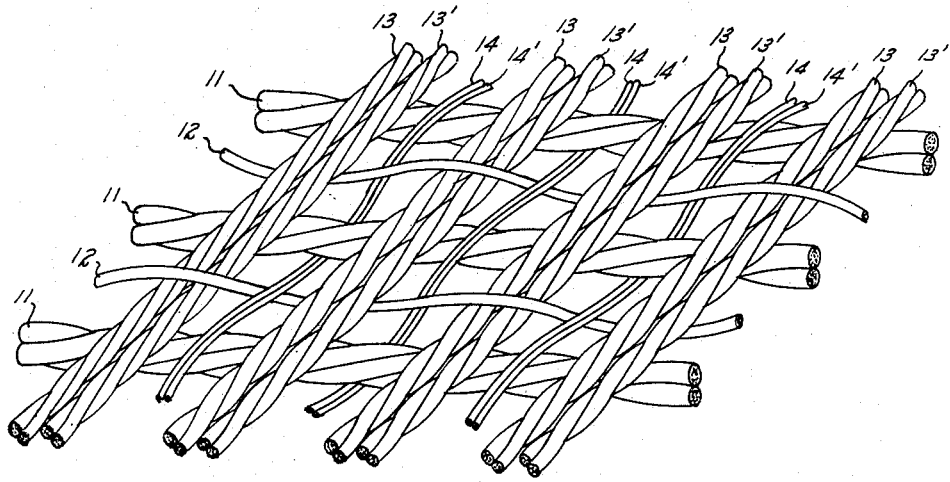
Figure 4 is a similar view of a modified embodiment comprising two layers of reinforcing yarns.

As clearly shown in Figure 1, the reinforcing yarns of a conventional woven material comprise warp and weft yarns 1, 2 and the sinuosity of these yarns 1, 2 results from the alternate interlacing and super-position thereof, irrespective of the yarn-binding process applied.

It is obvious that the sinuosities of yarns 1 and yarns 2 are complementary to each other, in that any tractive stress in one direction, for example warpwise, increases the sinuosity of the weft yarns, and vice versa. As a result, an interaction occurs between these warp and weft yarns which is detrimental to the dimensional stability of the ultimate laminated sheet material, and the only hitherto known remedy for this tendency is to endeavor to nullify either the yieldingness of the weft yarns, or the yieldingness of the warp yarns, and in both cases the material will work only in the direction of one of these components.

On the contrary, Figure 2 shows how the present invention enables a woven material to be made wherein the reinforcing yarns extend in their respective directions without passing alternately above and beneath the yarns of the other direction, therefore without any sinuosity whatever, while constituting a real woven material having warp and weft yarns of the same composition, and wherein equivalent mechanical properties are found in both warp and weft directions, in a manner fully independent of the stresses exerted in one or the other direction. The woven material shown in Figure 2 comprises two superposed layers of reinforcing yarns 3, 4, the parallel yarns 3 constituting for example the warp and the yarns 4 the weft of the woven structure; these main reinforcing yarns 3, 4 are held by means of small binding yarns comprising warp binding yarns 5 and weft binding yarns 6.

The reinforcing yarns 3, 4 consist preferably of yarns having a very high modulus of elasticity. A specific example of such yarns is the continuous filament yarns made of glass fibres and sold to the trade under the trademark "Fiberglas" by Owens-Corning Fiberglas Corporation of Toledo, Ohio. Other yarns having physical properties similar to that of glass fibre yarn also may be used.

In the embodiment shown in Figure 2, the reinforcing yarns 3, 4 are depicted as being in the form of non-twisted filaments or fibres which, theoretically, have a maximum modulus of elasticity. Such yarns may be obtained by applying a provisional sizing which may or may not be neutralized after the weaving operation. However, the difference in tensile strength and modulus of elasticity of non-twisted yarns compared with conventional twisted yarns is not substantial and therefore it may be preferred to use twisted yarns of the type which is readily available commercially and which is more suitable for use in textile weaving operations.

Preferably, the auxiliary binding yearns 5, 6 will consist of yarns having the smallest possible cross-section, in order to reduce the weight of the yarns exerting no direct reinforcing action in the structure and to enable these substantially more flexible binding yarns to be partially wound around the reinforcing yarns proper 3, 4, the latter being practically insensitive to this winding since their cross-section is considerably greater, as will be apparent from Figure 2. Since the purpose of the auxiliary binding yarns 5, 6 is merely to hold the reinforcing yarns in position, it is not necessary to use yarns 5, 6 having a high modulus of elasticity and substantially any flexible yarn of small cross-section would be satisfactory. However, to facilitate the subsequent laminating process, it usually is preferred to use yarns 5, 6 composed of the same material as the reinforcing yarns 3, 4, i.e., yarns formed of glass fibres or filaments.

During the weaving operation, the weaving loom is set to impart a relatively substantial tension to the reinforcing yarns 3, 4, so as to increase their longitudinal stability and therefore their insensitiveness to the very moderate stresses likely to be exerted by the binding yarns 5, 6, the latter being set to be woven with a considerable slackness around the reinforcing yarns 3, 4, as explained hereinabove.

It is a simple matter to reproduce the structure shown in Figure 2 by way of example, by suitably setting the rise and fall position of each yarn on a conventional weaving loom of the type comprising two warp beams, one for the reinforcing yarns 3 and the other for the binding yarns 5, the beam carrying the reinforcing yarn 3 being braked with a substantial force, while the other, carrying the binding yarns 5, will be moderately braked. Similarly, a relatively strong retarding force will be applied to the shuttle carrying the reinforcing weft yarn 4, and a light retarding force will be exerted on the shuttle carrying the binding weft yarn 6.

By way of specific example, a woven material of the type illustrated in Figure 2 may be obtained by using reinforcing yarns 3, 4 selected from the heavier glass fibre yarns available commercially, such as the Fiberglas ECG series having a count of approximately 1,800 yards per pound and a yarn diameter of the order of .02 inch. The binding yarns 5, 6 may be selected from the Fiberglas ECD series having a count of approximately 44,000 yards per pound and a yarn diameter of the order of .004 inch (approximately one-fifth of that of the reinforcing yarns). The reinforcing yarns may be spaced so that there will be approximately 30½ yarns to the inch both weftwise and warpwise.

Figure 3 shows another form of embodiment of the woven material according to this present invention, illustrating the possibility of using a number of reinforcing layers for obtaining a multi-layer structure.

In this example, three layers of reinforcing yarns 7, 8, 9 are superposed. The upper layer 7 and the lower layer 9 are directed warpwise. The intermediate layer 8 is a weft layer. It is apparent that an odd number of yarn layers (for example not only three, but five, seven, nine, ... etc., if desired) will facilitate the manufacture, in that it will be sufficient to provide a binding through binding weft yarns 10 only. The woven material will be coherent without providing binding yarns warpwise. In this case, the whole of the reinforcing yarns may be carried by a single warp beam and the weft made by only two shuttles, the one carrying the weft reinforcing yarn 8 and the other the weft binding yarn 10. Besides, it is also possible to fabricate the same type of woven material by disposing warpwise the central layer of reinforcing yarn and (on a separate beam) the layer of binding yarns. In this last instance, a single shuttle carrying the reinforcing weft would be sufficient. The corresponding figure would be similar to Figure 3, provided the yarns 7, 9 are considered as weft yarns, and the yarns 8, 10 as warp yarns, as if the material were rotated through 90° in its own plane.

Figure 4 shows yet another embodiment of the woven material according to this present invention, illustrating a form which is particularly adapted for weaving in some types of commercial textile machinery. It will be noted that in the embodiment of Figure 4 the yarns are depicted as having a moderate twist as compared with the straight or untwisted yarns shown in the embodiments of Figures 2 and 3.

In the woven material shown in Figure 4, the weave is basically the same as that of the embodiment shown in Figure 2. The reinforcing warp yarns 11 correspond to the reinforcing warp yarns 3, while the binding warp yarns 12 correspond to the binding warp yarns 5. In place of each of the single reinforcing weft yarns 4, however, there is substituted a pair of reinforcing weft yarns 13, 13', while in place of each of the single binding weft yarns 6 there is substituted a pair of binding weft yarns 14, 14'. The woven material of Figure 4 is woven essentially in the same manner as the woven material of Figure 2 except, of course, that each shuttle travels across the fabric and returns to its original position instead of merely traveling across the fabric from one side to the other.

Since it usually is desired to provide a woven material for use in laminations which is equally strong in all directions, it may be preferred when forming the woven material of Figure 4 to use weft yarns which are approximately half the size of the warp yarns, since as described above, the weft yarns appear in the material in pairs. By way of specific example, the reinforcing warp yarns 11 may be a Fiberglas yarn No. ECG 150–4/2 while the reinforcing weft yarns 13, 13' may be Fiberglas yarn No. ECG 150–2/2. Similarly, the binding warp yarns 12 may be Fiberglas yarn No. ECD 450–1/2, while the binder weft yarns 14, 14' may be Fiberglas yarn No. ECD 900–1/2.

While the foregoing describes but three forms of embodiment of the invention by way of example, it will be readily understood by anybody conversant with the art that many modifications may be brought thereto without departing from the spirit and scope of the invention, as set forth in the appended claims.

What I claim is:

1. A woven textile material having high tensile strength and a high modulus of elasticity for forming laminations with synthetic resins comprising weft reinforcing yarns extending substantially straight and parallel relative to one another, warp reinforcing yarns also extending substantially straight and parallel relative to one another, said warp reinforcing yarns being loosely positioned throughout their length superimposed on and extending substantially perpendicular to said weft reinforcing yarns, binding yarns extending in only one general direction and woven with said reinforcing yarns forming a sinuous partly wound pattern therearound for retaining said reinforcing yarns in their given position, said binding yarns being thin relative to said reinforcing yarns and said reinforcing yarns being formed of glass filament.

2. A woven textile material having high tensile strength and a high modulus of elasticity for forming laminations with synthetic resins comprising a weft consisting of reinforcing glass fiber yarns alternating with relatively thin flexible binding yarns and said weft reinforcing and binding yarns extending substantially parallel to one another, a warp consisting of reinforcing glass fiber yarns alternating with relatively thin flexible binding yarns and said warp reinforcing and binding yarns extending substantially parallel to one another, said warp reinforcing yarns being loosely superimposed on said weft reinforcing yarns and extending substantially perpendicular thereto and said weft and warp binding yarns being interlaced, respectively with said weft and warp reinforcing yarns and with each other for holding said reinforcing yarns in their relative positions.

3. A woven textile material having high tensile strength and a high modulus of elasticity for forming laminations with synthetic resins comprising weft reinforcing yarns extending substantially straight and parallel relative to one another, pairs of warp reinforcing yarns also extending substantially perpendicular to said weft reinforcing yarns, said warp reinforcing yarns being substantially of less thickness than said weft reinforcing yarns with the warp yarns of each pair of warp reinforcing yarns being positioned adjacent one another and each pair thereof spaced from the remaining pairs, warp binding yarns being positioned between adjacent pairs of warp reinforcing yarns and interwoven with said weft reinforcing yarns, weft binding yarns being positioned between said weft reinforcing yarns and interwoven with said warp reinforcing yarns and said warp binding yarns and said warp and weft binding yarns being flexible and of relative less thickness than said warp reinforcing yarns.

4. A woven textile material as claimed in claim 3 wherein said warp and weft reinforcing yarns each consists of a plurality of yarns twisted together along their length.

References Cited in the file of this patent

UNITED STATES PATENTS

| | | |
|---|---|---|
| 975,940 | Fetterly | Nov. 15, 1910 |
| 1,947,754 | Bolger | Feb. 20, 1934 |
| 1,964,419 | Asten | June 26, 1934 |
| 2,594,693 | Smith | Apr. 29, 1952 |

FOREIGN PATENTS

| | | |
|---|---|---|
| 49,327 | France | Apr. 19, 1861 |

OTHER REFERENCES

"Products for Plastic Reinforcement," further identified as "Fiberglas Standards PR6.C1, July 1952," Owens-Corning Fiberglas Corporation Booklet. Eight pages.